Sept. 25, 1934. M. M. SHUSTER Re. 19,327

HOBBY HORSE

Original Filed Jan. 23, 1934

INVENTOR
Meyer M. Shuster
BY
Herbert S. Fairbanks
ATTORNEY

Reissued Sept. 25, 1934 Re. 19,327

UNITED STATES PATENT OFFICE 19,327

HOBBY HORSE

Myer M. Shuster, Philadelphia, Pa.

Original No. 1,961,796, dated June 5, 1934, Serial No. 707,907, January 23, 1934. Application for reissue July 3, 1934, Serial No. 733,619

6 Claims. (Cl. 272—55)

The object of my invention is to devise a novel hobby horse which will have a minimum of weight, so that a small child can carry it around, which will be durable in construction, and which can be manufactured at a minimum cost.

With the above and other objects in view as will hereinafter clearly appear my invention comprehends a novel hobby horse.

It further comprehends a novel hobby horse wherein the pivoted seat bar has an additional support on which it rocks, and the spring has one end held by a bolt which secures the standard to the base while the other end is connected with an eye bolt or hook with a threaded shank which passes through an opening in the forward end of the seat bar and is provided with a wing nut which is manually actuated to vary the tension of the spring.

It further comprehends a novel construction of a standard in which the seat bar is pivoted, and a novel tension device for the seat bar, the standard being provided with a foot rest.

Other novel features of construction and advantage will be more clearly set forth in the detailed description and the appended claims.

For the purpose of illustrating the invention I have shown in the accompanying drawing a typical embodiment of it, which, in practice, will give satisfactory and reliable results. It is, however, to be understood that the various instrumentalities of which my invention consists can be variously arranged and organized, and my invention is not limited to the exact arrangement and organization of these instrumentalities as herein set forth.

Similar numerals indicate corresponding parts.

Referring to the drawing:—

Figure 1:
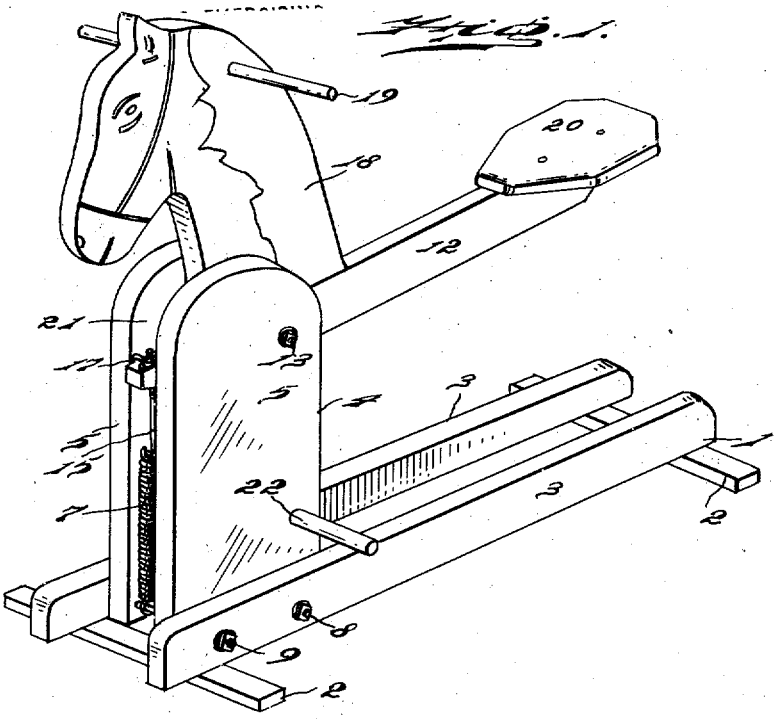
Figure 1 is a perspective view of a hobby horse embodying my invention.
Figure 2:
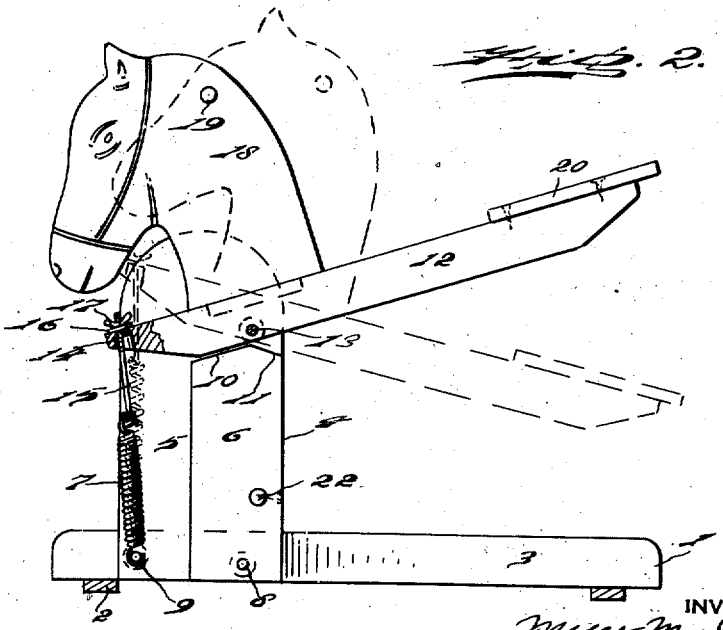
Figure 2 is a sectional elevation of the hobby horse.

1 designates the base of a hobby horse embodying my invention. The base is of skeleton formation, and consists of the cross bars 2 secured to the longitudinally extending base members 3, which latter are also secured to a standard 4. This standard 4 consists of two spaced members 5 preferably rounded at their upper ends and maintained in spaced relationship by a stop member 6 which is of less width than the members 5 to form a pocket to receive and preferably conceal a spring 7.

8 designates a bolt passing through the base members 3 the standard members 5 and the member 6. A front bolt 9 is also employed which passes through the base members 3 and standard members 5, and serves not only to secure such members together but also as a support for the lower end of the spring 7.

The upper end of the member 6 is reversely inclined as at 10 and 11 to serve as stops to limit the extent of rocking movement of a rocking member illustrated as a seat bar 12 which rests on said member 6 and is mounted on a bolt 13 passing through the standard members 5 and serving as a pivot pin. The forward end of the bar has an opening 14 through it which is enlarged at its bottom and adapted to receive an eye bolt or hook 15, the threaded shank of which passes through the opening 14 in the seat bar and is provided with a washer 16 and a wing nut 17. The seat bar has a board 18 fixed to it which is in the form of a horses head and neck, and this board has secured to it a handle bar 19. 20 is a seat fixed to the rear end of the seat bar 12. The seat bar and a portion of the neck are located in the slot 21 formed between the standard members 5 at their upper ends so that any material side sway of the seat bar during its rocking movement is prevented.

The neck portion of the head is preferably dovetailed into the seat bar and glued thereto.

The parts of the hobby horse except for the fastening devices may be of wood or any other suitable material so that the hobby horse can be very economically manufactured, and as the seat bar and spring are assembled with bolts, washers, and nuts, the cost of assembly has been reduced to a minimum.

In the operation, the child sits on the seat 20 with his hands on the handle bar 19 and his feet on the foot rest 22 in the form of a rod passing through the standard members and the stop support.

By turning the wing nut 17, the tension of the spring can be adjusted by a child or unskilled operator, to adapt the hobby horse to receive children of different weights, since the seat bar will rest at such time on the stop portion 10 of the member 6.

The single opening 14 at the forward end of the seat bar is larger at its bottom to provide clearance for the bolt 15 during the rocking movement of the seat bar.

Although the hobby horse is preferably made of wood, it is within the scope of the invention to construct it of metal or other suitable material.

The head and neck are preferably painted to simulate an animal and although I have referred to my present invention as a hobby horse, it will be apparent that it can be shaped and painted to simulate any desired animal and is not limited to the representation of the head of a horse.

It will now be apparent that I have devised a new and useful hobby horse, which embodies the features of advantage enumerated as desirable in the statement of the invention and the above description, and while I have, in the present instance, shown and described a preferred embodiment thereof which will give in practice satisfactory and reliable results, it is to be understood that this embodiment is susceptible of modification in various particulars without departing from the spirit or scope of the invention or sacrificing any of its advantages.

Having thus described my invention, what I claim as new and desire to secure by Letters Patent is:—

1. In a hobby horse, a base, a standard rising therefrom comprising spaced members with a stop member between them having reversely inclined stop faces, a seat bar pivoted to said spaced member and having its rocking movement limited by said stop faces, a bolt passing through said base and standard, a spring having its lower end receiving said bolt, a threaded bolt connected with said spring and passing through the forward portion of said seat bar, and a wing nut engaging said last named bolt above the seat bar to vary the tension of said spring.

2. In a hobby horse, a base, a standard rising therefrom comprising spaced flat members with a stop member between them, a seat bar fulcrumed between said members, rockable on and having its extent of movement limited by said stop member, a bolt securing said base to said standard, a spring through the lower end of which said bolt passes, said seat bar having a single opening at its forward end, and a threaded member connected with said spring, passing through said opening and having a nut bearing against the top of the seat bar to vary the tension of said spring.

3. In a hobby horse, a base comprising longitudinal bars and cross bars secured to them, a standard comprising spaced members with a stop member to form such spacing and having stop faces, a seat bar fulcrumed between said spaced members and having its rocking movement limited by said stop faces, a fastening device securing said base to said standard, a spring connected at one end with said fastening device, and concealed between said spaced members, and means to adjustably connect said spring to the forward end of said seat bar.

4. In a hobby horse, a base, a standard having spaced members, a seat bar pivoted between said members and having a representation of an animal's head fixed to its forward end and a seat at its rear end, means to limit the extent of rocking movement of the seat bar, a fastening device securing said base and standard together, a spring connected at its lower end with said fastening device, means to adjustably connect said spring with said seat bar, a handle for said head, and a foot rest fixed to said standard.

5. In a hobby horse, a base comprising longitudinal bars and cross bars secured to them, a standard comprising spaced members with a stop member to form such spacing and having stop faces, a seat bar fulcrumed intermediate its ends between said spaced members and having its rocking movement limited by said stop faces, a fastening device securing said base to said standard, a spring connected at one end with said fastening device, and means to connect said spring to the forward end of said seat bar.

6. In a hobby horse, a support, a stop member carried by said support and having reversely inclined stop faces, a seat bar pivoted near its forward end to said support and having its rocking movement limited by said stop faces, and a spring connected with said seat bar and said support and tending to retain the rear end of said bar in raised position.

MYER M. SHUSTER.